Oct. 11, 1955    J. M. BIELAWA    2,720,031
CONICAL TAPER MEASURING APPARATUS
Filed July 29, 1950    5 Sheets-Sheet 1
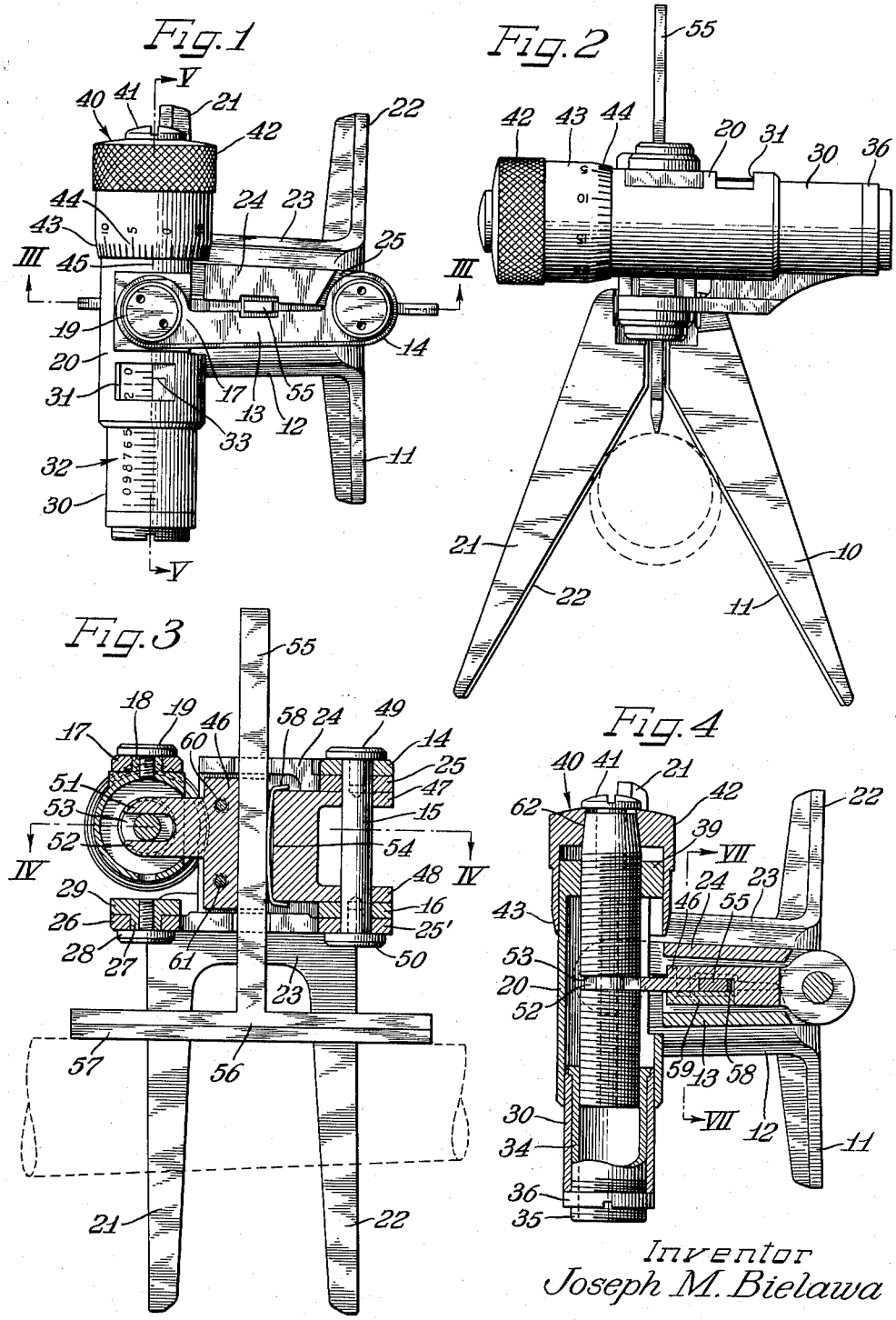
Inventor
Joseph M. Bielawa
by Frank J. Foley  Atty Oct. 11, 1955   J. M. BIELAWA   2,720,031
CONICAL TAPER MEASURING APPARATUS
Filed July 29, 1950   5 Sheets-Sheet 2
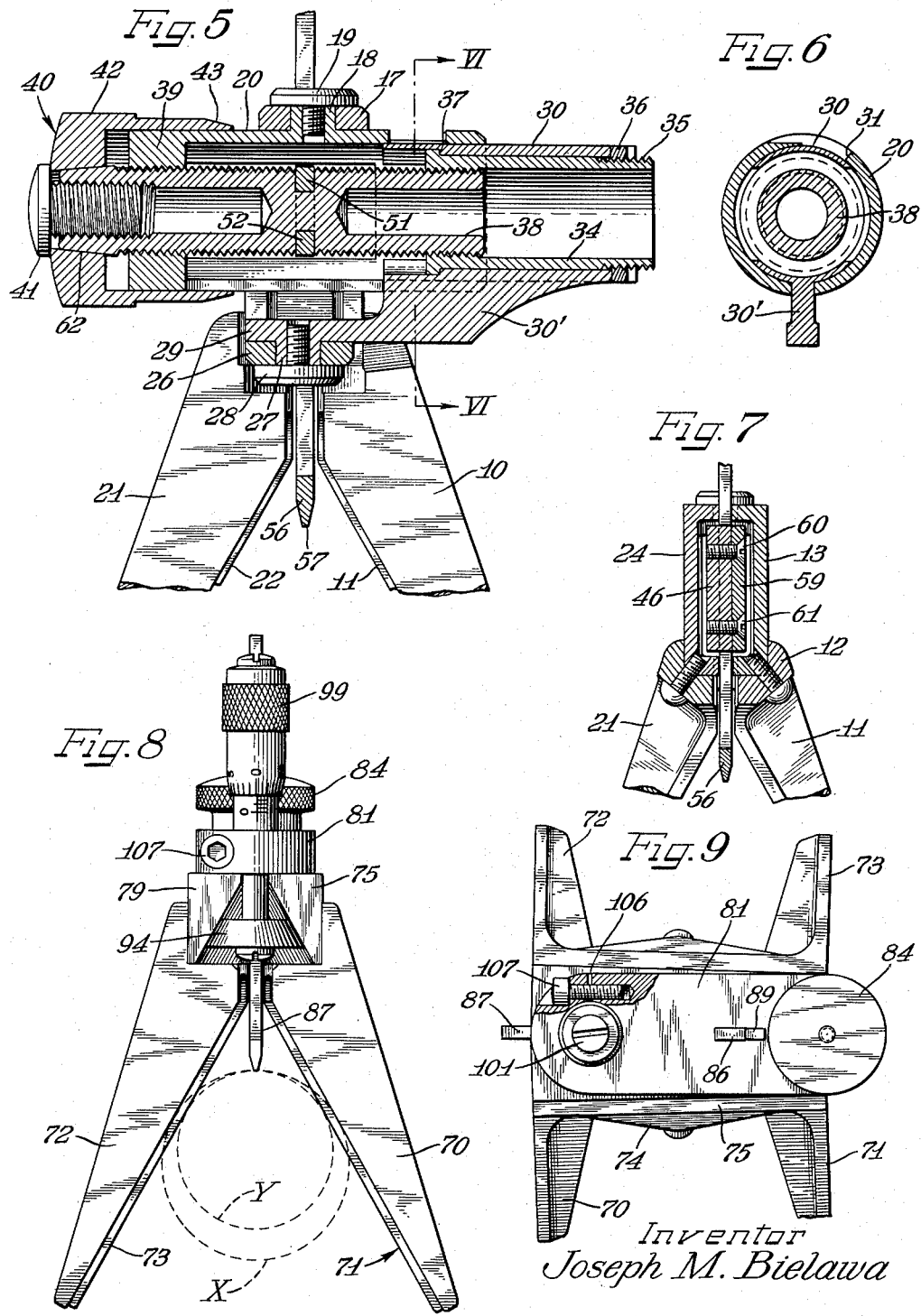
Inventor
Joseph M. Bielawa
by Frank J. Foley Atty Oct. 11, 1955 J. M. BIELAWA 2,720,031
CONICAL TAPER MEASURING APPARATUS
Filed July 29, 1950 5 Sheets-Sheet 3
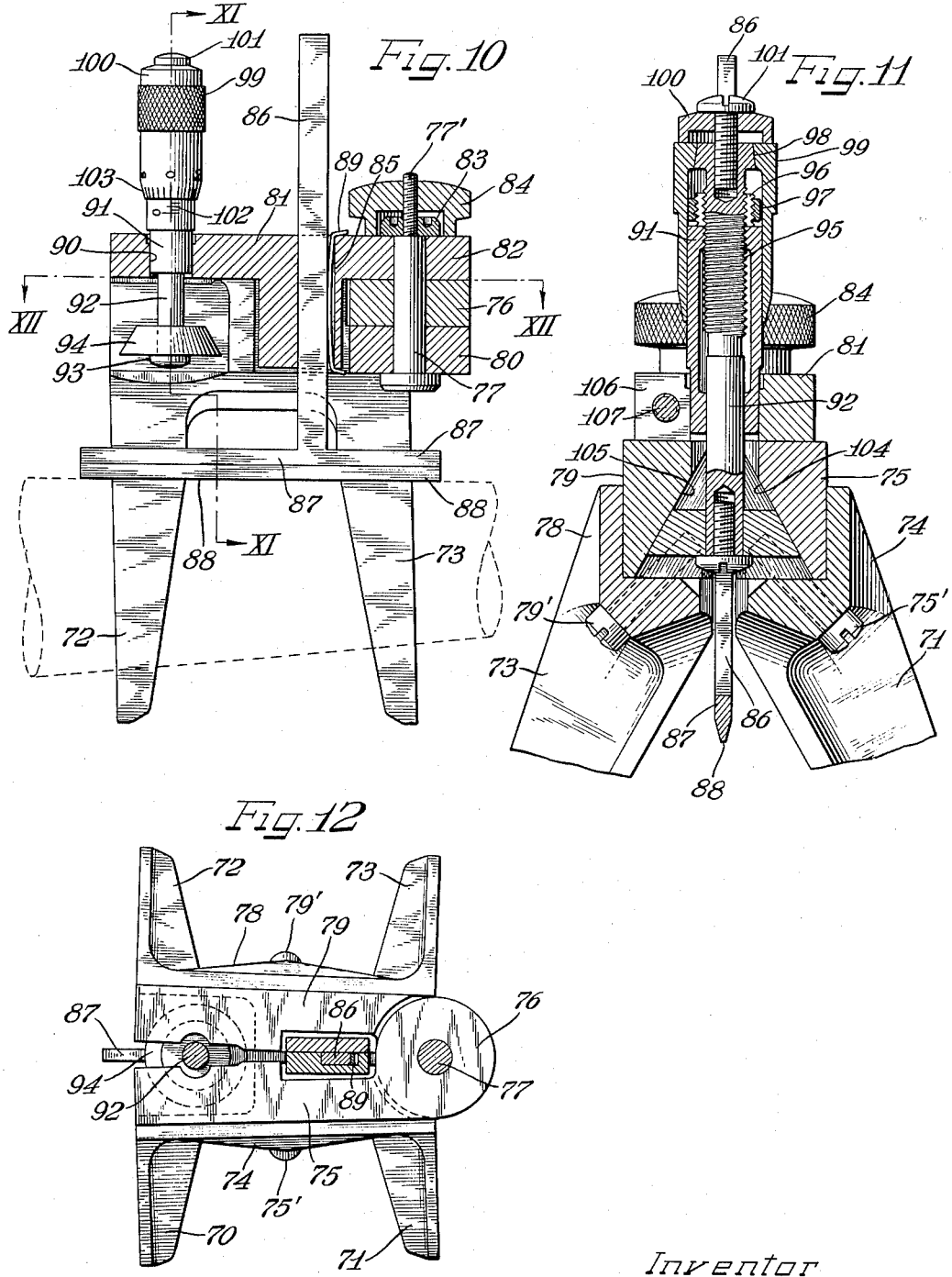
Inventor
Joseph M. Bielawa
by Frank J. Foley Atty

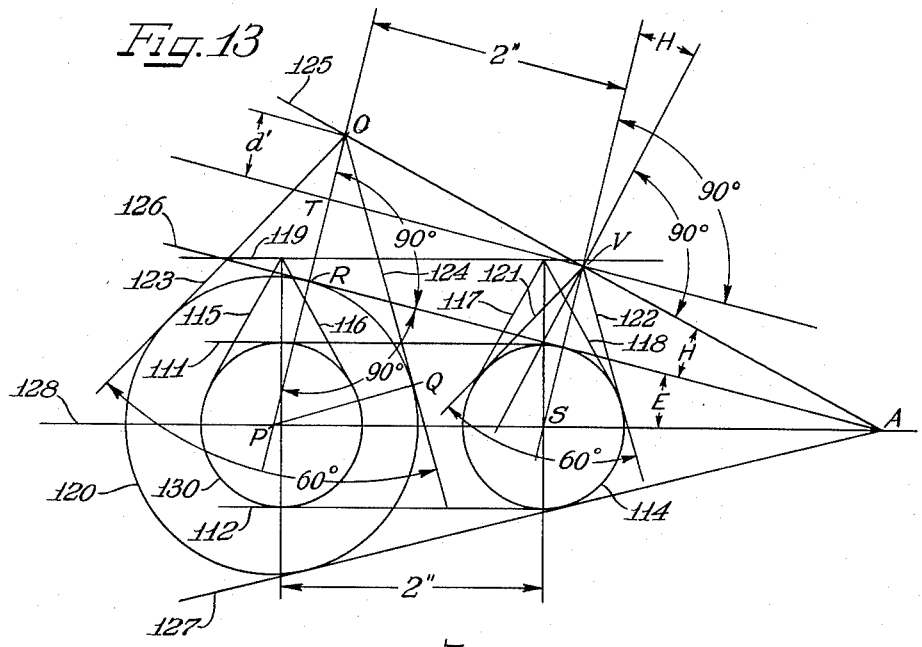
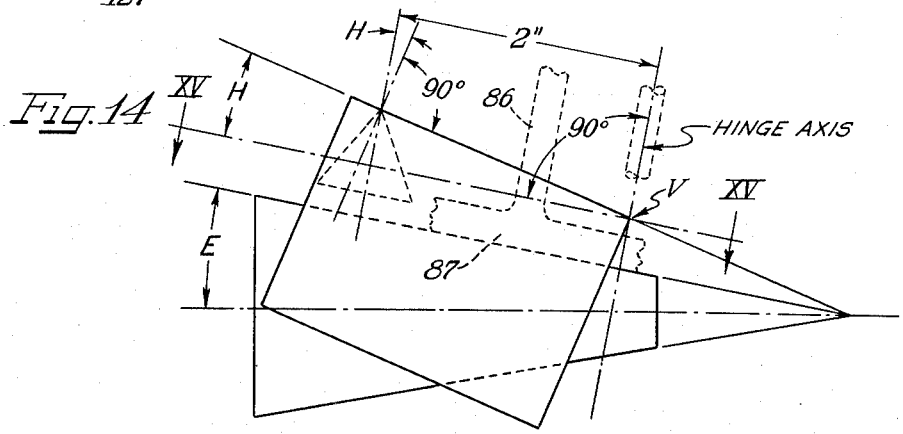
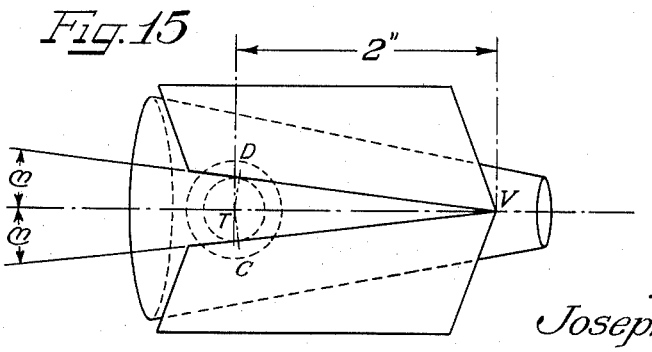
Inventor
Joseph M. Bielawa

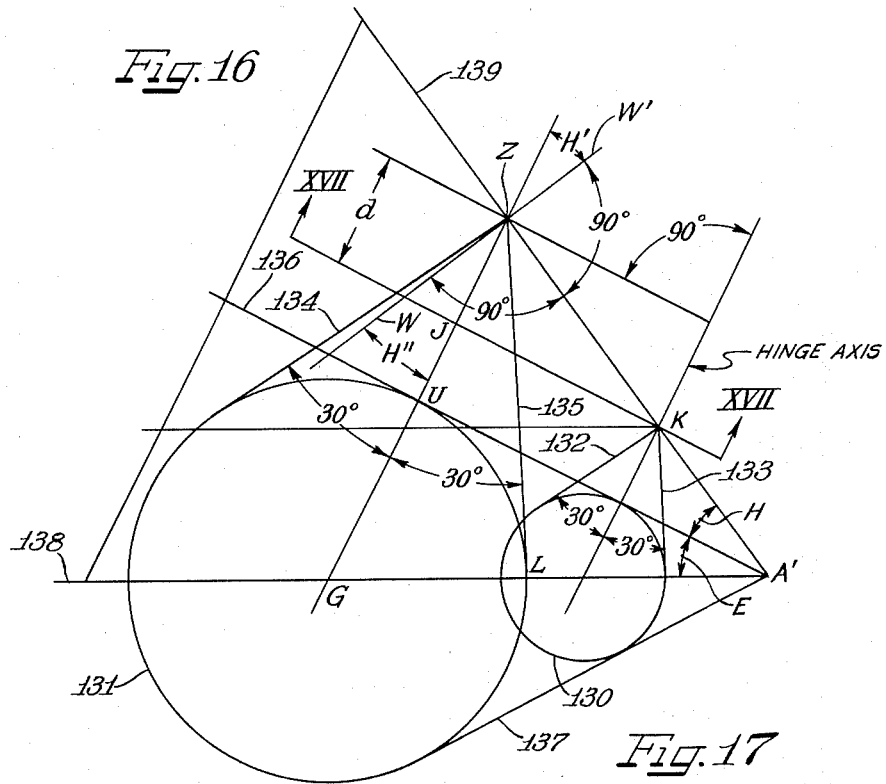

United States Patent Office 2,720,031
Patented Oct. 11, 1955

2,720,031

CONICAL TAPER MEASURING APPARATUS

Joseph M. Bielawa, Chicago, Ill.

Application July 29, 1950, Serial No. 176,701

14 Claims. (Cl. 33—174)

This invention relates to apparatus for measuring conical tapers, and is particularly useful for measuring the tapers on drills, reamers and numerous other devices in which the degree and uniformity of taper is important.

Heretofore the measuring of tapers has been difficult and in most cases has been accomplished by resorting to computations. The present invention, however, aims to provide a direct reading apparatus which can be placed upon a tapered surface to determine how much taper it then possesses and to ascertain whether the existing taper is in accordance with specifications.

Another object of the invention is to provide a taper measuring apparatus in the form of a compact unit which may be placed directly upon the tapered surface to be measured and which is provided with micrometer controlled adjustment to align it with the existing taper in order to obtain a direct reading upon the scale which forms a part of the apparatus.

Another object of the invention is to provide a direct reading taper measuring device which when adjusted to indicate a particular desired taper affords a ready means for visually observing whether the articles being tested subsequently correspond to the indicated taper, and if not, a simple adjustment will indicate the variance.

Other and further objects and advantages of the invention will be mentioned hereinafter and will become apparent from a perusal of this specification, in which two embodiments of the invention are disclosed for the purpose of illustrating the nature of the invention and the manner of using it.

In the drawings:

Figure 1 is a top plan view of one form of the device;

Figure 2 is an end elevation of the same form of the device;

Figure 3 is a vertical sectional view on the line III—III of Figure 1;

Figure 4 is a horizontal sectional view on the line IV—IV of Figure 3;

Figure 5 is a longitudinal vertical sectional view on the line V—V of Figure 1;

Figure 6 is a sectional view taken on the line VI—VI of Figure 5;

Figure 7 is a vertical section on the line VII—VII of Figure 4;

Figures 8 to 12, inclusive, show a modified form of the invention; and Figure 8 is an end elevation thereof;

Figure 9 is a top plan view of the device shown in Figure 8;

Figure 10 is a vertical central sectional view through the device shown in Figure 8;

Figure 11 is a sectional view on the broken line XI—XI of Figure 10; and

Figure 12 is a horizontal sectional view on the line XII—XII of Figure 10.

Figure 13 is a diagrammatic illustration employed for comparing the placement on a cylinder and on a cone of the device shown in Figures 8 to 12 inclusive;

Figure 14 is an illustration, largely diagrammatic, showing the placement of the device of Figures 8 to 12 upon a conical or frusto-conical object;

Figure 15 is a diagrammatic illustration as viewed from the section line XV—XV of Figure 14;

Figure 16 is a diagrammatic illustration of placement on a conical object of the device shown in Figures 1 to 7 inclusive;

Figure 17 is a diagrammatic illustration as viewed from the section line XVII—XVII of Figure 16;

Figure 18 is further diagrammatic illustration to be referred to in an explanation of Figure 17;

Figure 19 is another diagrammatic illustration to be referred to in an explanation of Figure 17; and Figure 20 is a diagrammatic illustration of the contact planes employed in both devices.

Referring further to the drawings and particularly Figures 1 to 7, inclusive thereof, the device includes two relatively movable units each providing a plane surface or points of contact lying in plane surfaces, these units having a pivotal connection with each other so that they may be moved in a pivotal relation toward and away from each other, while a reversely threaded screw mechanism is employed to move them and simultaneously indicate a reading which may be expressed in terms of decimal parts of an inch, for example, the taper in thousands per inch of a tapered object being measured by the device.

One of the units includes a pair of inclined legs 10 and 11 which are rigidly and unitarily connected by the yoke 12 which in turn may be formed unitarily with or may be secured rigidly to the vertically extending plate 13, one end of which plate is provided with an upper ear 14 (Fig. 3) which is pivoted on the vertical pivot 15 while a lower ear 16 integral with plate 13 is pivoted on the lower end of the pivot pin 15. An arm 17 extending toward the micrometer mechanism from the top portion of the plate 13 is pivoted on a hollow post 18 and held thereon by means of a screw 19. The post 18 is formed integrally with a sleeve 20 which will be further described later.

As the micrometer reading shown in Figure 1 reads about .052, it means that the device as illustrated in the drawing is all set to read a taper of .052 per inch, hence the view in Figure 5 shows a portion of the leg 11 behind the front leg 10.

The other unit includes the legs 21 and 22 which may be formed integrally with a cross yoke 23 and integrally with or attached rigidly to a vertical plate 24, this plate being pivotally connected to the vertical pivot pin 15 by means of an upper ear 25 and a lower ear 25' (see Fig. 3). The forward end of the plate 24 is provided with an ear 26 which is pivoted on the hollow post 27 and held thereon by means of a screw 28. The post 27 is formed integrally with an ear 29 connected with the barrel 30.

It will be noted in Figure 3 that the legs 21 and 22 have inner faces of considerable area, which should be exactly parallel to each other and machined carefully to lie in the same plane throughout their areas. The inner faces of legs 10 and 11 likewise are so formed to constitute at spaced intervals continuations of a common plane.

It will be noted in Fig. 5 that the barrel 30 telescopes within the sleeve or barrel 20, a suitable slot being provided in the lower portion of the barrel 20 to accommodate the rib 30' which connects the barrel 30 with the ear 29, as illustrated in Figure 5. A slot 31 is provided in a portion of the barrel 20, as shown in Figure 1 to permit the operator to view the scale generally indicated as 32 which is inscribed on the outer surface of the barrel 30. In the illustrated embodiment an index line 33 is cut in one margin of the slot 31 upon a surface of the barrel 20 so that it may be registered with the indicia 32.

A sleeve 34 having threads 35 at its outer end is locked within the barrel 30 by means of a threaded collar 36 to bring the shoulder 37 of the sleeve 34 against the cooperating shoulder indicated in Figure 5 which is cut on the inside of the barrel 30.

The inner end of the sleeve 34 is internally threaded for engagement with cooperating threads provided on the screw 38, the opposite end of the screw 38 having threads cut reversely to the direction of the threads on the right hand end of the screw (Fig. 5), the other threads cooperating with the threads on the thickened end portion 39 of the barrel 20. An operating head generally indicated as 40 is secured in non-rotatable relation to the double threaded screw 38 by means of a cap screw 41, the operating head or thimble having a knurled portion 42 and a skirt portion 43, the latter carrying indicia 44, in the form of fifty numbered equally spaced lines, each space indicating one fiftieth of a complete revolution of the thimble and screw 38, one revolution effecting a movement of .050 inch axially of each of the barrels 20 and 34 relatively to the reversely threaded screw 38. Barrel 30 moves with 34, being locked to it. The skirt 43 of the operating head is telescoped over the barrel 20 as indicated, and the indicia lines thereon may be registered with an index line 45 which is cut in the surface of the barrel 20. It will be apparent therefore that rotation of the operating head 40 through the action of the reversely threaded screw 38 will cause the barrels 20 and 30 to move relatively to each other.

The two units just described provide opposing plane surfaces defined by the legs 10 and 11 and the other pair of legs 21 and 22. Both units pivot on post 15, the legs 10 and 11 being connected by arm 17 to barrel 20, while the other pair of legs are connected at hollow post 27 to barrel 30.

A third unit, which is always maintained in a central position in the device will now be described. A vertically extending plate 46 is positioned between the vertical plates 24 and 13 (Fig. 7) and has a pair of end ears 47 and 48 through which the pivot pin 15 extends. The assembly of various pivoting ears from the three units which pivot on the post 15 are held assembled by cap screws 49 and 50. At the opposite end of the vertical plate 46 is an extension having a pair of fingers 51 and 52 which extend into an annular groove 53 located centrally in the screw 38, the central core of this screw reduced by the groove 53 being embraced by these fingers. Thus the reversely threaded propelling screw 38 being so engaged with the central plate 46 may rotate relatively thereto but may have no endwise movement relatively thereto. However, rotation of the screw 38 will cause the two barrels to move not only relatively to each other, simultaneously outwardly from each other, or simultaneously inwardly toward each other, but as well moving relatively to the central upstanding plate 46.

A vertically extending slot 54 is provided in the plate 46 through which extends the vertical shank 55 of a gauge bar 56 integral therewith and disposed at right angles thereto. The lower edge 57 of this gauge bar should be somewhat tapered similarly to a knife edge and should provide a perfectly straight edge for contact with the tapered surfaces to be measured. In order that the shank of the gauge may be raised and lowered readily I provide a spring 58 disposed as shown which resiliently and frictionally engages the gauge shank permitting it to be moved freely but nevertheless holding it firmly and accurately in its slot in any adjusted position.

The slot 54 provided in plate 46 normally is closed on one side by a small plate 59 secured thereto by the screws 60 and 61 as shown in Fig. 7.

The device shown in Figures 1 to 7, inclusive, is so designed and built that when the two planes for contact with the tapered object have been adjusted to what may be rather inaccurately called a parallel position, with the micrometer reading zero, the two contact planes formed by the pairs of legs 10 and 11 and legs 21 and 22 may be placed upon a cylindrical object and they will make tangential contact with the surface of the cylinder along a pair of lines which will lie in a single plane perpendicular to the shank 55 of the gauge and parallel to the straight edge 57 thereof. Upon assembly of the device the zero position of the micrometer thimble at surface 43 may readily be adjusted to register the "parallelism" of the contact surfaces provided by the legs of the device by loosening the screw 41, backing the operating head 40 slightly off the tapered end 62 of the screw 38 and retightening the screw 41 when the micrometer thimble is properly adjusted to the zero position.

In using the device shown in Figures 1 to 7, inclusive, to measure the taper of a shaft, drill shank and etc. the legs of the device are dropped down into embracing relation with such tapered surface. The straight edge 50 will be lowered toward tangential contact with the top of the tapered object and if it is not parallel with the top surface of the object at first the micrometer head will be rotated to spread the legs of the apparatus or draw them together until the straight edge 57 is exactly parallel to the top surface of the object, as may be observed visually by lowering it until it is in contact all along with that surface. When the legs of the device are resting firmly in tangential contact with the object being measured and the straight edge is in parallel contact to the surface thereof the total taper per inch of the surface contacted by the legs of the device will be directly readable upon the micrometer scales of the apparatus. For example, the space between adjoining lines in the scale 32 represents .050 of an inch and the space between each pair of numbered lines, those numbered 1, 2, 3 and etc. represent .100 of an inch of total taper per lineal inch of the axis of the object, and the reading indicated at the index line 45 on the thimble scale 44 indicates thousandths of an inch in addition to such multiples of .050 as are read on the scale 32. By "total taper" is meant the increase in diameter of the conical object between two points one inch apart along the axis of the object.

When the contact planes formed by the legs of the device are rotated to the zero reading position, the angle of divergence of these two planes, in the illustrated embodiment is 60°, while a vertical plane passing through the T bar or gauge bisects this 60° angle and passes through the line at which these two planes intersect.

The modification illustrated in Figures 8 to 12, inclusive, also provides two contact planes, which in the zero position of the device diverge from each other at 60° angles. These contact planes are formed by the legs 70 and 71 as one unit and the pair of legs 72 and 73 as the other unit, each of these legs having on their inner faces plane surfaces accurately machined for that purpose. The pair of legs 70 and 71 are joined by a yoke 74 and is rigidly united to a horizontal bar 75 having an ear 76 pivoted on the vertical post 77.

The other pair of legs 72 and 73 are united by a cross yoke 78 secured rigidly to a cross bar 79 having an ear 80 also pivoted on the post 77.

An intermediate member consists of the top plate 81 having an ear 82 pivoted on the post 77. Extending upwardly from the post is a screw 77' on which is threaded a nut 83 holding the ears and post in assembled pivotal relation. A nut 84, also threaded on screw 77', when tightened down against ear 82 will hold all three ears 82, 76 and 80 under compression and thus in a locked position. To permit their relative rotation the nut 84 may be slightly loosened when rotation of the units is required.

The top plate further is provided with a vertical slot 85 through which extends the shank 86 of a T bar having a horizontal head 87 at the bottom of which is a straight edge 88, this straight edge being perpendicular to the axial length of the shank 86. A spring 89 frictionally holds the shank 86 in any adjusted position in the slot.

The forward end of the plate 81 is provided with a vertical bore 90 in which is firmly fixed a non-rotatable sleeve 91 providing a vertical bearing for a rotatable shaft 92. At the lower end of the shaft is a head 93 which retains a frusto-conical member 94 rotatably mounted upon the shaft 92.

Within the sleeve 91 the shaft is threaded at 95 for engagement with internal threads on sleeve 91 and with an internally threaded split collar 96 which is formed as a reduced extension of the upper end of the sleeve 91, this collar being surrounded by a threaded clamping ring 97. The upper end of the shaft 92 is tapered at 98 as shown in Figure 11 to engage with a corresponding tapered surface on the thimble 99 and is held clamped thereto non-rotatably by means of a collar 100 and a screw 101 threadedly engaged with the upper end of the shaft 92. Thus by rotating the thimble 99 the shaft 92 is caused to rotate.

As indicated in Figure 10 the outer surface of the sleeve 91 is provided with a scale 102 reading in thousandths of an inch and the thimble itself at its lower edge is also provided with a scale 103.

Each of the bars 75 and 79 are provided near their their unpivoted ends with divergently tapered inner surfaces designated as 104 and 105 in Figure 11, the 60° angle of these surfaces corresponding with the angle of the periphery of the frusto-conical member 94.

When these two opposing contact planes formed by the legs 70 to 73 are rotated toward each other to the zero position, the contact planes which they provide intersect at an angle of 60° along a line lying in the central plane of the vertically slidable T bar. It is apparent that if the shaft 92 be rotated by means of the micrometer thimble to cause the cone 94 to rise relatively to the stationary sleeve 91, and the lock nut 84 be at that time loose, the cone 94 will cause the two pairs of legs to recede from each other, rotating about the vertical pivot post 77.

When the device of the modified form is used for measuring a taper the legs of the device are caused to straddle the tapered article and surfaces 104 and 105 are held in firm contact with cone 94 by one hand of the operator gripping the legs 70 and 72. The straight edge 88 of the T bar will be lowered toward the nearest surface of the conical article and the shaft 92 will be rotated upwardly causing the cone to spread the legs of the device while they are still held in contact with the sides of the conical article until the bottom edge 88 of the T bar is observed to be parallel to the top surface of the article being measured. This can be accurately determined by lowering the bar 88 until, when the angle of the plane contact surfaces is properly adjusted to conform to the taper of the article, the straight edge 88 will be exactly parallel to and in contact with the surface of the tapered article. This position is illustrated in Figure 10 and also in Figure 8 where the legs 72 and 70 are shown tangent to the dotted circle X while the other pair of legs 73 and 71 are shown tangent to the smaller circle Y, each circle representing the circumference of a section of the conical object at spaced intervals along the axis of the object.

As indicated in Figures 11 and 12 yoke 74 is secured to bar 75 by screw 75', while yoke 78 is secured to bar 79 by screw 79'.

The top plate 81 is cut inwardly at 106 (see Figs. 9 and 11) to the bore provided to receive sleeve 92 and a screw 107 bridging the gap of the cut serves to pinch or bind the sleeve in the plate.

The amount of rotation of spindle 92 required to spread the leg units of the device until the lower edge of the T bar is parallel with the uppermost surface of the tapered object can be read on the micrometer scales and directly indicates the taper per inch of the object being measured.

The nut 84 permits the device to be locked against further rotation of the leg units wherever desired.

The structure of each of the two forms of the invention have now been fully described. The reason why each is able to and does in fact measure and indicate directly the total taper in thousandths of an inch per inch of the length of the central axis of conical objects will now be explained.

For the sake of brevity, the device shown in Figures 1 to 7 inclusive will hereinafter be termed "Model 1," while the device shown in Figures 8 to 12 inclusive will be termed "Model 8."

Referring now to Model 8, the pivot pin 77 shown in Fig. 10 provides the "hinge axis" of the rotatable contact planes formed by the pairs of legs 70—71 and 72—73. The distance between the central axis of pin 77 and the central axis of shaft 92 is exactly two inches (2").

If the shaft 92 be rotated until it indicates zero taper and Model 8 were placed astride a cylinder and the contact planes be rotated toward each other into tangency with the cylinder whereupon the surfaces 104 and 105 (Fig. 11) will contact the frusto-conical member 94, the line of intersection of the contact planes will be as shown in the perspective view, Fig. 20. A plane normal to this line of intersection will cut the two contact planes along two lines forming a 60° angle, which angle is bisected by the bisecting plane shown in Fig. 20. This line of intersection of the contact plane is designated as 110 in Fig. 20.

In Fig. 13 the parallel lines 111 and 112 represent a cylinder astride of which is placed Model 8 while set at the zero taper reading. As the two contact planes diverge vertically from each other at a 60° angle and are tangent with the cylinder they also are tangent with spheres having great circles lying in the cylinder surface. The tangency of these planes with the cylinder or spheres can be and is represented diagrammatically in Fig. 13 by the equal-sized circles 113 and 114 in combination with the pair of lines 115 and 116 and another pair of lines 117 and 118, each pair forming a 60° angle and being tangent to the circles which are tangent with lines 111 and 112. The line of intersection of the contact planes when astride this cylinder is line 119.

In the same diagrammatic manner Fig. 13 also represents Model 8 astride a conical object. Let circle 114 represent the same sphere but now one having less than a great circle on its surface lying in the surface of the conical object. The larger circle 120, not concentric with circle 113, represents another sphere positioned in a larger portion of the cone, also having less than a great circle on its surface tangent with and lying in the surface of the conical object.

Lines 121 and 122 form an angle of 60° and are tangent to sphere or circle 114. Lines 123 and 124 likewise form a 60° angle and are tangent to sphere or circle 120. The apexes of these two 60° angles mark a line 125 which represents the line of plane intersection of the contact planes of Model 8 when astride a cone outlined by lines 126 and 127 embracing spheres 120 and 114. This is the cone whose taper Model 8 will measure.

The axis of the cone is line 128. The total angle of divergence of the cone is twice the angle designated as E, the latter being half the total angle of taper of the cone.

Line PQ is the radius of the large circle 120 and since angle POQ is 30° and angle PQO is 90°, the angle OPQ is 60°. Therefore OP equals twice PQ, and line PR being equal to PQ, therefore RO equals PR. Therefore angle H equals angle E.

Let it be considered that lines 121 and 122 outline an imaginary cone whose axis coincides with the hinge axis of Model 8 and that this cone is tangent to the contact planes of Model 8. Line SV is the hinge axis and likewise the axis of that cone.

Let it be considered that lines 123 and 124 outline another imaginary cone tangent to the diverging contact planes of Model 8 and having a conical axis PRO coinciding with the axis of frusto-conical member 94 and shaft 92, this axis being two inches apart from the hinge axis.

The apex of each of these imaginary cones will lie in the line of plane intersection of the two contact planes of Model 8 as is evident from Fig. 13, wherein line 125 or AVO is that line. The amount of vertical translation of cone 123—124, that is, along its axis perpendicular to the adjacent surface of the conical object, in the act of measuring two conical objects the second having a larger taper than the first, will be proportional to the increase in diameter of the sphere corresponding to sphere 120. For example, point O being the apex of imaginary cone 123—124 is located distance PO from the axis of the conical object, which distance equals the diameter of circle of sphere 120. The total taper per inch as measured is twice the tangent of the angle E.

Total taper per inch $= 2 \tan E$ $$E = H = \text{angle } TVO$$

Total taper per inch $= 2 \tan TVO$ $$2 \tan TVO = 2 \frac{TO}{TV} = TO = \text{total taper}$$

The total taper per inch, is readable directly upon the micrometer scale shown in Fig. 10, so long as the contact planes are tangent to the conical object and the T bar 87 is parallel to the adjacent surface of the conical object and the member 94 is in contact with surfaces 104 and 105. The screw threads of the micrometer and the scale are so proportioned that .001″ rise of cone 94 will read .001″ on the scale.

Figure 14 illustrates diagrammatically the placement of Model 8 on the conical object in the act of measuring its taper and Figure 15 is a sectional view on line XV—XV of Figure 14.

As will be more fully explained hereinafter in connection with Model 1, the angle B, that is, the angle of divergence of the contact planes, is always proportional to the angles E and H.

Figure 16 illustrates diagrammatically the use of Model 1 in measuring the taper of a conical object. Circles 130 and 131 may be considered as spheres having less than great circles thereof lying in the surface of the conical object. Lines 132 and 133 represent an imaginary 60° cone tangent with sphere 130 and having its axis coinciding with the hinge axis 15. Lines 134 and 135 represent an imaginary 60° cone tangent to the large sphere and having its conical axis passing through the center of the sphere parallel to the hinge axis and located 1.73205″ distant from said hinge axis.

Lines 136 and 137 represent the outlines of the conical object being measured. Since angle ZGL of Fig. 16 is a 60° angle the line ZG is twice the length of the radius GL, hence angle E and angle H are equal, angle E being the angle of taper.

Line 138 is the conical axis of the object being measured and line 139 is the line of intersection of the contact planes of Model 1 when tangent to this object and when the adjusting of T bar 56 into parallelism with the surface of the cone causes the hinge axis to be perpendicular to the surface of the cone.

In the sectional view in Fig. 17, the dotted lines 140 and 141 represent one of the contact planes and lines 142 and 143 represent the other contact plane, each being tangent to the cone suggested by circles 144 and 145.

In Fig. 16 the 60° cone represented in profile by lines 134 and 135 has its axis GZ at an angle H′ with the normal (line WZW′) to the line of plane intersection (line 139), considering all of the lines just mentioned as lines in a common plane.

Angle $H' = $ angle $H''$
Angle $UZA' = 90°$ less angle $H''$
Angle $UZA' = 90°$ less angle $H$ therefore $$H'' = H = H'$$

Angle $E = $ angle $H$ (as proved in re Fig. 13).

Angle B in Fig. 17 represents the angle which each contact plane has rotated away from zero taper position to be tangent to the cone represented by circles 144 and 145.

Figure 18 is an auxiliary view looking from line XVIII—XVIII on Fig. 17 and shows the cone whose base at the plane of line XVII—XVII has a diameter of $2a$, and an axis of $d$ length. (Compare Fig. 16).

$$\sin B = \frac{JM}{JK} = \frac{a}{c}$$

$$a = d \tan 30°$$

Angle $H = $ angle $JKZ$ of Fig. 16

$$\frac{d}{c} = \tan \text{ angle } JKZ$$

$$\frac{d}{c} = \tan H$$

$$c = \frac{d}{\tan H}$$

$$\frac{a}{c} = \frac{d \tan 30°}{\frac{d}{\tan H}} = \frac{d \tan 30° \tan H}{d} = \tan 30° \tan H$$

$$\sin B = \tan 30° \tan H$$

In Fig. 17 the right triangles JKM and JKN are equal and JK is common to both. Hence these triangles may be re-arranged as in Fig. 19 so that KM and KN are common and bisect the total angle of B plus B.

$$\sin B = \tan 30° \tan H$$

$$\tan H = \frac{\sin B}{\tan 30°}$$

$$\tan H = \frac{\frac{a}{c}}{\tan 30°} = \frac{a}{c \tan 30°}$$

Assume that $c \tan 30° = 1$, then $$\tan H = \frac{a}{1} = a$$

and $2 \tan H = $ taper per inch of conical taper if $c \tan 30° = 1$ $$c = \frac{1}{\tan 30°} = \frac{1}{.57735} = 1.73205$$

thus when $c = 1.73205$ $$\tan E = \tan H = \sin B = a$$

Model 1 measures the chord of the arc of divergence of the two contact planes, twice the value of $a$ or $2 \tan H = $ taper per inch. Therefore, the threads on screw 38 are so cut that upon rotation of the screw the micrometer scale will indicate directly in decimals of an inch twice the value of "A," or twice sin B or twice tan E or twice tan H.

In view of the above formulae and explanation thereof Model 1 is so proportioned that the distance from the center of hinge axis 15 (Fig. 3) to the central axis of each of the hollow posts 18 and 27 (Fig. 5) is 1.73205 inches, which is the distance c of Fig. 17 and KJ of Fig. 16.

It should now be apparent that both Model 1 and Model 8 directly indicate the taper of a conical object if their contact planes are tangent to it and the T-bar with which each is equipped is parallel to the adjacent conical surface.

For the sake of brevity, total taper is sometimes referred herein merely as taper, but in any case what is meant is the difference in diameters of a conical object measured at spaced apart positions. As it is quite common in machine shop practice to specify taper per inch the apparatus herein described is designed to indicate taper per inch.

While the two illustrated embodiments of the invention are each shown in their preferred forms it should be understood that the invention is susceptible of being embodied in other forms and modifications, and all such forms and variations are intended to be covered by the claims hereinafter appended.

Having shown and described my invention, I claim:

1. In a conical taper measuring apparatus, a pair of contact plane members and means hinging them on a common hinge axis, each member having a plurality of contact areas lying in a common plane for tangential contact with a conical object each said contact plane being inclined and hinged for rotation at a 60° angle to an imaginary plane normal to the hinge axis, said contact planes being rotatable away from each other from a normal position where the line of intersection of said contact planes is parallel to said imaginary plane, and measuring means operatively associated with said hinging means extensible in proportion to the angle of divergence of said contact planes from said normal position for indicating the taper of a conical object tangentially contacted by both planes while their hinge axis is maintained perpendicular to a median line on the surface of said object midway between the lines of contact of said contact planes with said object, means connected with said hinge means for indicating when a perpendicular relation exists between the axis of the hinge means and a median line on the surface of a conical object embraced by said members said measuring means being so positioned relatively to the hinge axis and so proportioned as to measure the tangent of said angle of divergence.

2. In a conical taper measuring apparatus, a pair of contact members and means hinging them on a common axis, each member having substantial area in a single plane for tangential contact with opposite sides of a conical object, the normal zero taper position of said contact planes being such that they intersect on a line normal to their hinge axis and diverge from each other at a 60° angle, taper measuring means connected with said hinge axis, control means connected with said contact members, means connected with said hinge means for indicating when a perpendicular relation exists between the axis of the hinge means and a median line on the surface of a conical object embraced by said members and means connected with said measuring means and cooperating with said control means for coordinating the measuring means with the angle of rotation of said contact members about their hinge axis.

3. A conical taper measuring apparatus comprising a pair of contact members having opposing faces defining symmetrically diverging planes for tangential contact with a conical object, means hinging said members symmetrically about a common hinge axis with said faces inclined at 60° to a plane perpendicular to the hinge axis, a median member disposed between the contact members hinged about the same axis, taper indicating means having portions having operative engagement with said contact members and having another portion operatively connected with the first portions rotatable in said median member and held thereby against shifting in a plane perpendicular to said hinge axis, said first portions being movable in proportion to the angle between the axis of a conical object tangentially embraced by said contact members when their hinge axis is perpendicular to the conical object and the line of intersection of the planes of said opposing faces, means connected with said hinge means for indicating when a perpendicular relation exists between the axis of the hinge means and a median line on the surface of a conical object embraced by said members said indicating means including means proportioned to convert the movement of said first portions into an indication of taper per inch by measurement of the tangent of said angle.

4. A conical taper measuring apparatus comprising a pair of contact members having opposing faces defining symmetrically diverging planes for tangential contact with a conical object, means hinging said members symmetrically about a common hinge axis with said faces inclined at 60° to a plane perpendicular to the hinge axis, a median member hinged about the same axis, taper indicating means having portions movable relatively to said contact members and having another portion rotatable in said median member and held thereby against shifting in a plane perpendicular to said hinge axis, said first portions being movable transversely to the axis of said hinge means in proportion to the angle between the axis of a conical object tangentially embraced by said contact members when their hinge axis is perpendicular to the conical object and the line of intersection of the planes of said opposing faces, means connected with said hinge means for indicating when a perpendicular relation exists between the axis of the hinge means and a median line on the surface of a conical object embraced by said members said indicating means including means indicating taper per inch in proportion to the degree of said angle.

5. A conical taper measuring apparatus comprising a pair of contact members and means hinging them on a common hinge axis, each member having substantial area in a single contact plane for tangential contact with opposite sides of a conical object, said planes being inclined at 60° to a plane normal to their hinge axis, means supported on said hinge axis positioned between said members and having an alignment member for parallel alignment with a median line on the surface of a conical object tangentially embraced by said contact members for indicating when the hinge axis becomes perpendicular to said median line an intermediate member connected to said hinge axis, and shiftable taper indicating means mounted on said intermediate member and operative upon said contact members to rotate them about said hinge axis, said indicating means when operating on said contact members being shiftable in proportion to variations in the size of the angle between the line of intersection of the contact planes and the axis of any conical object tangentially embraced by said contact planes when their common axis is normal to the conical surface intersected thereby, said indicating means including means converting the aforesaid shifting motion into a measurement of the tangent of said angle expressed in taper per unit of lineal measurement.

6. A conical taper measuring apparatus comprising a pair of contact members having opposing faces defining symmetrically diverging planes for tangential contact with a conical object, means hinging said members on a common hinge axis, a median member hinged about the same axis, a screw mounted on said median member for rotation and held against axial shifting relatively thereto, threads of opposite hand on the ends of the screw and operatively connected with said contact members whereby rotation of the screw in one direction swings the contact members toward each other and opposite rotation of the screw swings them away from each other, said planes being inclined at 60° to a plane perpendicular to said common axis, means connected with said hinge means for indicating when a perpendicular relation exists between the axis of the hinge means and a median line on the surface of a conical object embraced by said members and indicating means operable by rotation of said screw for indicating the taper of a conical object tangentially embraced by said contact members when their common axis is normal to the cone surface intersected by said axis.

7. A conical taper measuring apparatus comprising a pair of contact members providing contact planes for tangentially contacting a conical object, means hinging said members upon a common hinge axis normal to a plane to which they are symmetrically and oppositely inclined at 60°, means connected with said hinge means for indicating when a perpendicular relation exists between the axis of the hinge means and a median line on the surface of a conical object embraced by said members, means movable parallel to the hinge axis for rotating said members about said axis and taper indicating means actuated thereby and having pointer and indicia means movable relatively to each other responsive to said actuation in proportion to the size of the angle between the line of intersection of the contact planes and the axis of a conical object tangentially embraced by said contact planes when their common axis is normal to the conical surface embraced by said members, the relative movement of the pointer and indicia means being proportioned in a predetermined manner to measure the tangent of said angle and indicate it in terms of said taper per unit of lineal measurement.

8. A conical taper measuring apparatus comprising a pair of contact members providing contact planes for tangentially contacting a conical object, means hinging said members upon a common hinge axis normal to a plane to which they are symmetrically and oppositely inclined at 60°, means connected with said hinge means for indicating when a perpendicular relation exists between the axis of the hinge means and a median line on the surface of a conical object embraced by said members, means operable to rotate said members about said axis in proportion to the angle between the line of intersection of the contact planes and the axis of a conical object tangentially embraced by said contact planes when said axis is normal to the embraced conical surface, and taper indicating means actuated by said rotating means, said taper indicating means having relatively movable pointer and indicia means correlated in a predetermined manner when operated during the rotation of said members to measure the tangent of said angle and indicate it in terms of taper per unit of lineal measurement.

9. In a conical taper measuring apparatus, a pair of contact plane members and means hinging them about a common hinge axis, each member providing a plurality of spaced apart points in a common plane for tangential contact with a conical object, said contact planes when in normal zero taper position diverging from each other at 60° and from a line of intersection of said planes parallel to an imaginary plane normal to their hinge axis, and indicating means connected with said hinge axis and operatively associated with said members and extensible in proportion to the angle of divergence of said contact planes from their line of intersection and limited in such extension by the divergent position of said planes when said planes are tangent to a conical object being measured with the hinge axis of the contact planes maintained perpendicular to the conical surface for indicating the taper per inch of each object, means connected with said hinge means for indicating when a perpendicular relation exists between the axis of the hinge means and a median line on the surface of a conical object embraced by said members said measuring means being so positioned relatively to the hinge axis and so proportioned in its extension movement as to measure the tangent of said divergence.

10. A conical taper measuring apparatus comprising a pair of inclined opposed contact members each having a plane surface of substantial extent for tangential contact with a conical object to be measured, means hinging said members upon a common pivot and supporting said members in a symmetrically inclined position whereby when the line of intersection of said planes of said members is normal to their hinge axis the angle of intersection of the planes with their line of intersection is 60°, control means operatively associated with said hinging means for movement in engagement therewith during the hinging movements of said members, and indicating means connected with the control means for movement relatively thereto in proportion to the angle of divergence of said planes about their hinge axis, means connected with said hinge means for indicating when a perpendicular relation exists between the axis of the hinge means and a median line on the surface of a conical object embraced by said members said indicating means including means translating its movement relative to the control means into a visual indication of the taper of a conical object tangentially contacted by said contact members when their hinge axis is perpendicular to the conical surface.

11. In a conical taper measuring apparatus, a pair of members having opposing faces defining symmetrically diverging contact planes for tangential contact with a conical object, means hinging said members symmetrically about a common hinge axis, said planes being inclined at 60° to a plane normal to their hinge axis, an adjustable straight edge bar slidably connected with said hinge means for movement selectively into positions all perpendicular to the hinge axis and for movement into contact with a median line on the surface of a conical object embraced by said contact planes for indicating perpendicularity of said hinge axis to the longitudinal surface of the conical object, and measuring means including means having operative engagement with said members extensible in proportion to the divergence of said planes from said normal position when the planes tangentially embrace said object with said hinge axis in the last said perpendicular position for indicating responsive to such extension the taper per inch of said object.

12. A conical taper measuring apparatus comprising a pair of contact members and means hinging said members symmetrically about a common hinge axis, said members having opposing contact faces defining symmetrically diverging planes inclined at 60° to a plane normal to their hinge axis, means movably connected with the hinge means for visually indicating the establishment of a perpendicular relation between the axis of the hinge means and the surface of a conical object when tangentially embraced by said contact faces, control means connected with said hinge means and supported thereby for relative movement parallel to the hinge axis and movable when in operative engagement with said hinging means during the hinging movement of said members, and taper measuring and indicating means operatively connected with said control means for simultaneous movement coordinated therewith for measuring the tangent of the angle between the projected line of intersection of said planes and a plane normal to said hinge axis, thus indicating the taper of the conical object embraced by said members when their hinge axis is perpendicular to the surface of the conical object.

13. A conical taper measuring apparatus comprising a pair of contact members and means hinging said members symmetrically about a common hinge axis, said members having opposing contact faces defining symmetrically diverging planes inclined at 60° to a plane normal to their hinge axis, means movably connected with said hinge means for bodily movement in a plane intersecting the hinge axis for visually indicating the establishment of a perpendicular relation between the hinge axis and a median line on the surface of a conical object tangentially embraced by said contact faces at points equidistant from said median line, a taper responsive element supported on the hinge means equidistant between said contact members for relative movement parallel to the hinge axis and movable when in operative engagement with said hinge means during the hinging movement of said members, and taper measuring and indicating means operatively connected with the taper responsive element for simultaneous movement co-ordinated therewith for measuring the tangent of the angle between the projected line of intersection of said planes and a plane normal to said hinge axis, thus indicating the taper of the conical object embraced by said members when their hinge axis is perpendicular to the surface of the conical object.

14. A conical taper measuring apparatus comprising a pair of contact members providing opposed contact planes for tangentially contacting a conical object, means hinging said members about a common hinge axis and maintaining said planes oppositely inclined at 60° to a plane normal to said hinge axis, said members being supported on said hinge means and extending downwardly therefrom and diverging outwardly from each other, means connected with the hinge means and slidable parallel thereto and providing a straight edge sight bar disposed between said contact members equidistant from each, said sight bar indicating when a perpendicular relation exists between the hinge axis and the surface of a conical object tangentially embraced by said contact planes, means operable for rotating said members about said axis, and taper indicating means actuated by said rotating means in proportion to the rotational movement of said members and including relatively movable pointer and indicia means whose relative movement when the indicating means is so actuated measures the tangent of the angle between the line of intersection of the contact planes and the axis of the conical object tangentially embraced by said contact planes when said axis is normal to the embraced conical surface, said tangent of the angle being indicated in terms of taper per lineal unit.

References Cited in the file of this patent

UNITED STATES PATENTS

| | | |
|---|---|---|
| 62,267 | Hatch | Feb. 19, 1867 |
| 181,809 | Williams | Sept. 5, 1876 |
| 1,201,342 | Peck | Oct. 17, 1916 |
| 2,460,854 | Smith | Feb. 8, 1949 |